June 30, 1925

C. R. MILLER

ICE SCORING MACHINE

Filed Aug. 20, 1923

C. R. MILLER

ICE SCORING MACHINE

Filed Aug 20, 1923

Inventor
Charles R. Miller
By
Jesse R. Stone
Attorney

Patented June 30, 1925.

1,543,864

UNITED STATES PATENT OFFICE.

CHARLES R. MILLER, OF HOUSTON, TEXAS.

ICE-SCORING MACHINE.

Application filed August 20, 1923. Serial No. 658,301.

*To all whom it may concern:*

Be it known that I, CHARLES R. MILLER, a citizen of the United States, residing at Houston, Harris County, Texas, have invented a certain new and useful Improvement in Ice-Scoring Machines, of which the following is a full, clear, and exact description, such as will enable others skilled in the art to which it appertains to make and use the same.

My invention relates to machines for scoring ice in blocks so that the blocks of ice may be readily broken into smaller blocks of a desired size.

Ice is usually artificially frozen in large blocks of several hundred pounds in weight. Natural ice is customarily cut in large blocks of a desired size. When this ice is delivered to the consumer, it must be cut into blocks of a smaller size of twenty-five, fifty or one hundred pounds in weight. The large blocks are usually chipped into the smaller sizes by the delivery man on the wagon by means of a small pick or axe. The result is that the smaller blocks thus cut are very irregular in size and there is a material waste in thus hacking the larger blocks into the smaller sizes.

It is an object of my invention to provide a machine for scoring the larger blocks of ice along regular division lines so that they may be easily broken into smaller blocks of the desired size by the delivery man, without waste. It is desired that this machine cut the block on longitudinal and transverse lines, and that the cutting operations be entirely automatic.

Another object is to construct a machine which is simple and strong in construction, and not liable to get out of order.

It is a further object that the machine be adapted to both score the ice and then to deliver it from the machine out of the way of the next block to be scored.

Other objects and the manner in which these objects are accomplished, will more clearly appear from the description which follows. Referring to the drawings herewith.

In the drawing, I have shown my apparatus mounted upon a frame work of angle iron or channel iron, of ordinary construction comprising two side frames made up of a series of upright supports 1 and transverse bars 2 at the lower end and 3 at the upper end. These two sides frames are held in spaced relation at the upper and lower ends by short connecting plates 4 at convenient points.

Mounted on this framework on each outer side about midway of the height thereof are horizontal shafts 5 supported in bearings 6 on the uprights. The shafts 5 have thereon, toward the rear of the machine, two spaced circular saws 7 and 8. The forward ends of the shafts have beveled gears 9, each meshing with a similar gear 10 on an upright shaft 11, supported in bearings 12 and 13 on cross members on the frame.

The shaft 11 has a saw 14 at its lower end spaced upward from the base of the machine a predetermined distance. It has at its upper end a bevel gear 15 which meshes with a similar gear 16 on a cross shaft 17, which is thereby enabled to communicate rotative movement to the saw shafts.

Mounted centrally on the shaft 17 is a pulley 18. The shaft 17 is extended outwardly beyond the gear 16 on one end and has thereon a second pulley 19, which is adapted for connection with a pulley 20 upon an electric motor 21 by means of a belt 22.

Spaced rearwardly away from the motor is a second transverse shaft 23 mounted for rotation in bearings 24 on the frame members 3. Midway the ends of the shaft 23 is a pulley 25 idle on the shaft, but adapted to be engaged thereto by means of a clutch 26 adjacent thereto. A belt 27 connects said pulley 25 to the pulley 18 previously referred to. On one end of the shaft 23 beyond the frame is a small gear 28. On the opposite end, outside the frame are mounted two pulleys, 29 and 30, the pulley 29 being fixed on the shaft and the pulley 30 being idle thereon. A twisted belt 31 connects either of said pulleys to a pulley 32 on the shaft of the motor 21. By giving a twist to the belt, the shaft 23 may be driven in a direction opposite to the direction of rotative motion imparted to the shaft through the belt 27.

Spaced somewhat from the rear end on the frame 3 is an elevator operating shaft 34, mounted in bearings 35 and having on its outer end a gear 36 adapted to mesh with a comparatively small gear 37 on an adjacent transverse shaft 38 mounted in bearings 39 on the frame. On the opposite end of shaft 38 is a large gear 40 engaging with the gear 28 previously referred to. It will be noted that by the use of the reduction gears 28, 40, 37 and 36, the shaft 34 may be driven at a speed much less than the speed of the motor.

Figure 3:
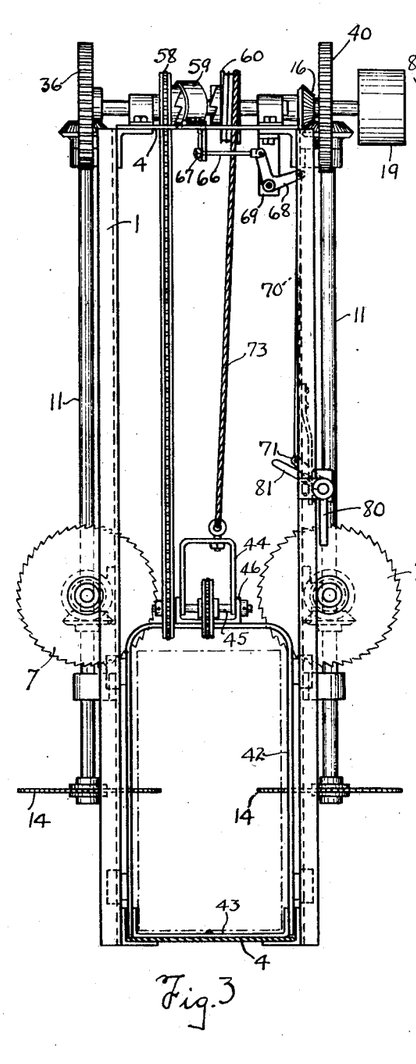
Fig. 3 is an end elevation.

At the rear end of the machine and directly below the two saws, 7 and 8, is an elevator shaped to receive a block of ice to be sawed. This elevator comprises a rectangular frame having a U-shaped upright member 42, as shown in Fig. 3, the lower end of which is connected with an elevator platform 43 upon which the ice is placed. The upper end of the elevator is connected to a bail 44, pivoted at its lower end upon a cross bolt 45, secured in a channel iron 46 at the upper end of the frame 42. The channel iron 46 extends from the forward end of the frame centrally thereof between the two side frame members, to a point beyond the two rear saws 14, as shown particularly in Fig. 5. The elevator is slidable vertically in the frame and has on the uprights 42 at each end thereof, anti-friction rollers 47, which bear against the sides of the frame and hold the elevator in vertical alignment as it is raised and lowered in the frame.

The channel iron 46, which is secured to the elevator, also serves as a support for a sprocket chain, which is mounted on sprocket wheels 49 and 50 at each end of the iron. One of these sprocket wheels is mounted upon a shaft 51, journaled in the upright sides of the channel iron, and allowing the sprocket wheel to extend downwardly through slots in the lower side of the supporting member. Upon these sprocket wheels a chain 52 is adapted to operate. Its upper portion extends above the longitudinal channel iron, and the lower portion runs beneath the same. The chain has at opposite points thereon, outwardly extending arms 53 and 54, these arms being adapted to contact with the cake of ice, when desired to move it longitudinally in the frame. The shaft 55 upon which the sprocket wheel 49 is mounted, extends beyond the channel iron, and has adjacent thereto a sprocket wheel 56 upon which an operating sprocket chain 57 may operate, said chain making a connection between the sprocket wheel 56 and a similar sprocket wheel 58 upon the shaft 34, previously described. The sprocket wheel 58 is idle on the shaft, and may be clutched into operative connection with said shaft by means of a slidable dental clutch, 59.

Figures 5, 9:
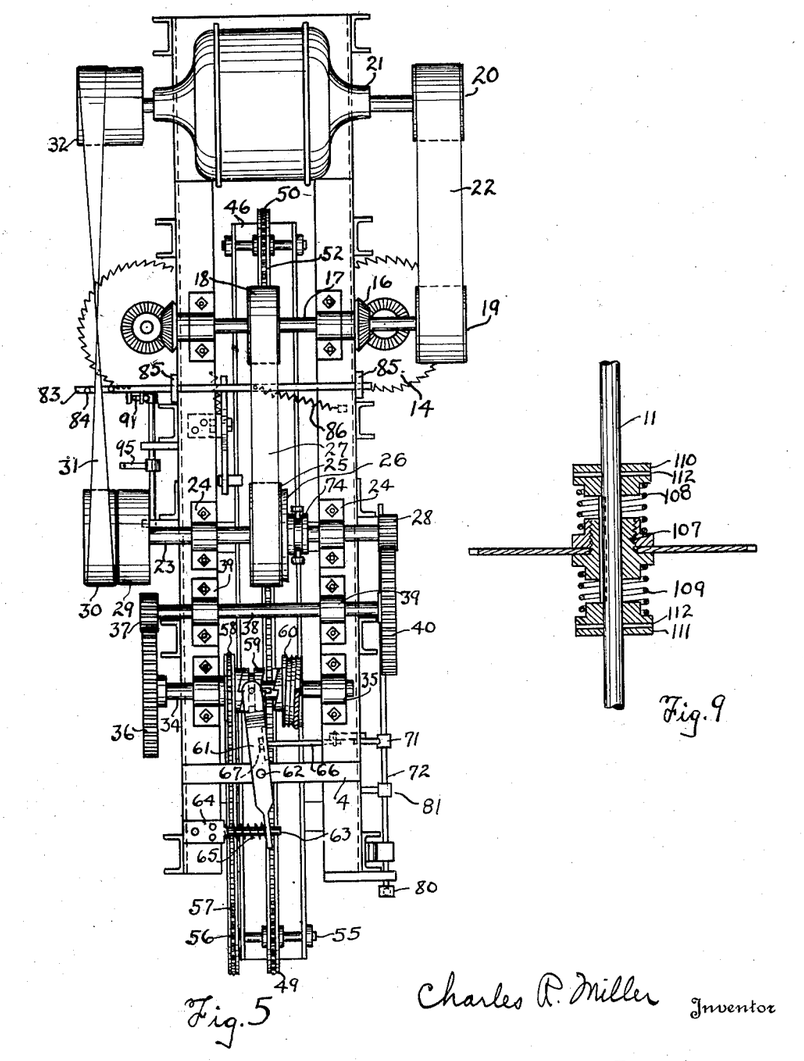
Fig. 5 is a top plan view.
Fig. 9 is a broken detail in central section of a mounting for the saws which may be employed. Like numerals are used to designate like parts in all the views.

Mounted upon the shaft 34 and closely adjacent the clutch member 59 is a cable drum or pulley, 60. This drum is also mounted idle on the shaft, and may be clutched into connection therewith by means of the previously mentioned clutch 59 which has teeth on both sides thereof, adapted to cooperate with teeth on either the drum 60 or the sprocket wheel 58, as may be desired. The clutch is operated by means of a lever 61 pivoted at 62 upon a cross member 4 of the frame. Its opposite end is provided with an opening whereby it may be slidable upon a pin 63, secured at 64 upon the member 3 of the frame. Between the frame member 3 and the outer arm of the lever 61 is a spiral spring 65, which is under compression and tends to throw the arm of the lever into a left hand position, as shown in Fig. 5. The lever arm 61 is adapted to be operated by the assistance of a rod 66, which is slidable through an opening in the lower side of the said arm, and has a nut 67 thereon to catch against the lever arm when the rod is moved in one direction against the action of the spring 65, but allowing the rod to slide relative to the arm when said rod is moved in the opposite direction. The outer end of the rod 66 is connected to a bell crank lever 68, pivoted on a depending plate 69 from the frame, the opposite end of the lever 68 being connected to a rod 70 which is connected at its other end to an arm 71, fixed upon a rotatable shaft 72, secured horizontally within the supporting frame.

The elevator is adapted to be raised by a cable 73, secured at its lower end to the bail 44 and adapted to wind about the drum 60 at its upper end. The reeling of the cable upon the said drum will raise the elevator in an obvious manner.

Figure 1:
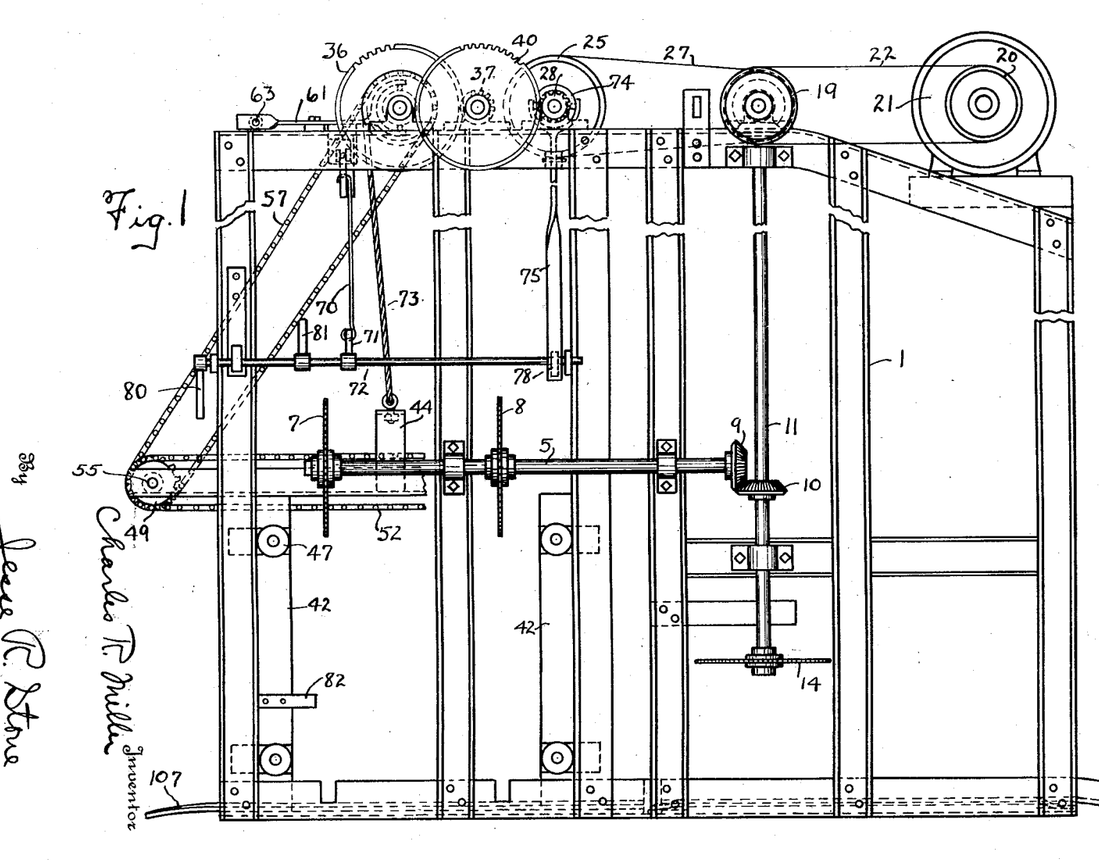
Fig. 1 is a side elevation of my device.

The clutch controlling collar 74, which connects the pulley 25 to the shaft 23 is slidable upon the shaft by means of a clutch-shifting lever 75, fulcrumed at 76 to a plate 77 on the frame. The clutch lever extends downwardly to the pivot 76, and is then inclined outwardly and downwardly to bear against a cam member 78 upon the rod 72. The lever arm is held in resilient contact with said cam by means of a spring 79 connecting said lever arm with the upright member 1 of the frame. At the rearward end of the frame, the rod 72 is provided with an operating lever 80, by means of which a rotative movement may be given thereto. An inwardly extending arm 81 on the said shaft 72 is adapted to be acted upon at the desired point in the operation of the elevator by means of a finger 82 on the side of the elevator frame, as seen particularly in Fig. 1.

Figure 2:
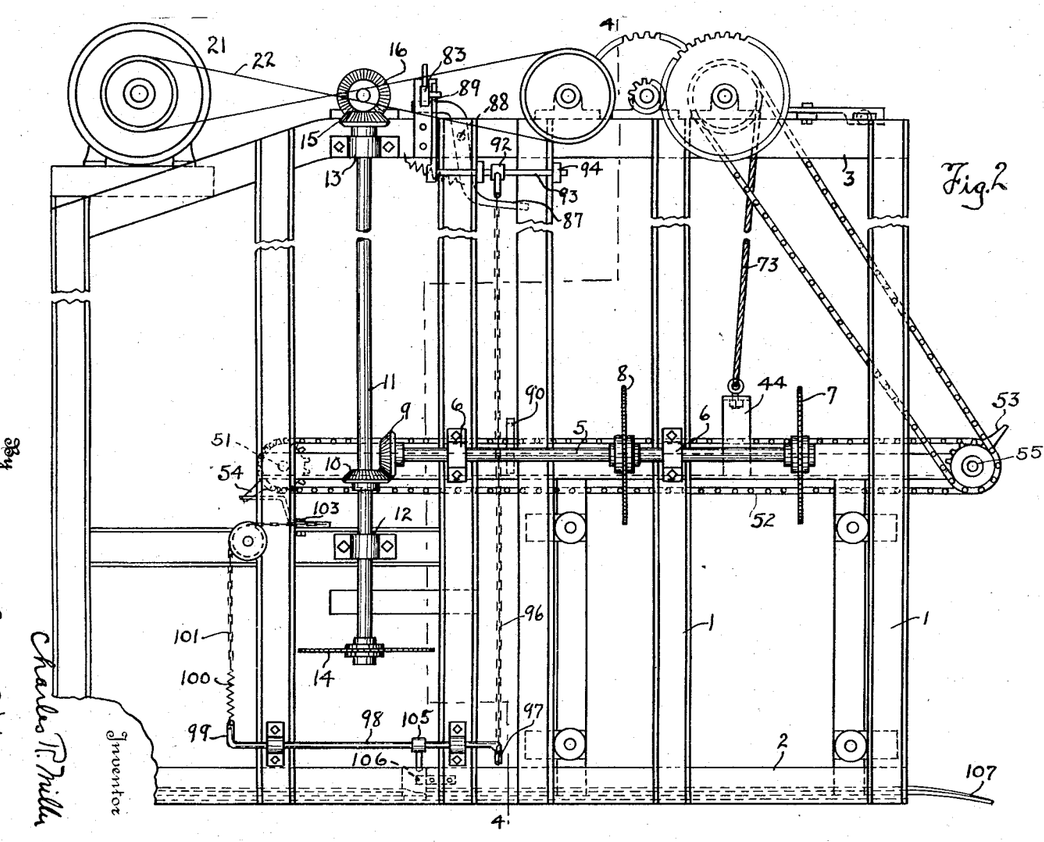
Fig. 2 is a side elevation thereof from the opposite side.
Figure 4:
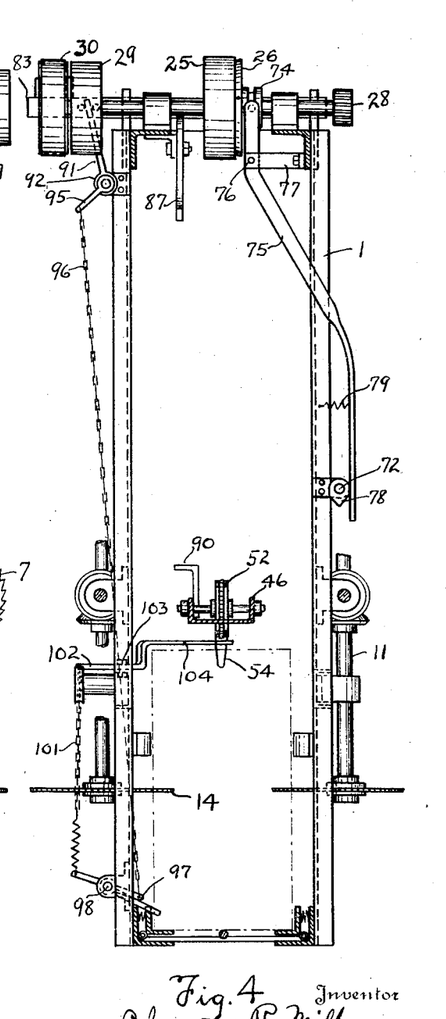
Fig. 4 is a vertical section taken approximately on line 4—4 of Fig. 2.

The belt 31 running from the pulleys 30 and 32 may be shifted from the pulley 30 to the pulley 29, by means of a belt shifting mechanism, comprising a rod or bar 83, mounted on the upper portion of the frame. This bar has two upwardly extending fingers, 84, thereon, one on each side of the said belt. The rod is slidable transversely of the frame in the supporting plates 85, 85. It is adapted to be thrown to the right from the position as shown in Fig. 5 by means of a spring 86 secured at one end to the frame member 3, and at the other end to a point centrally of the belt-shifting rod. It is held in neutral position under ordinary circumstances by means of a lever 87, the shape of which is best seen in Fig. 2. It is pivoted at 88 to the frame, and is curved forwardly and adapted to fit within a notch 89 in the lower side of the bar 83, thus preventing a sliding movement of the belt-shifting bar. The lower end of the lever arm is also bent laterally at 87 to contact with a trigger 90 upon the upper end of the channel iron 46 directly beneath the said lever. This trigger is shown best in Fig. 4.

The belt-shifting bar is also acted upon by means of an arm 91 upon a lever 92, secured to a shaft 93, journaled in bearings 94 in the upright members of the frame beneath the belt-shifting bar. A lower arm 95 on the shaft 93 extends approximately at right angles to the arm 91 and is connected at its outer end by means of a flexible chain or other connecting means 96 to the crank arm 97 upon an operating shaft 98, shown in Fig. 2. This shaft is journaled in bearings in the frame and has at its opposite end a crank arm 99 connected resiliently by means of a spring 100 to a chain or cable 101. This chain 101 is adapted to be operatively connected to an arm 102, shown best in Fig. 4. Said lever 102 is pivoted at 103 in the frame and has a forward arm 104 extending inwardly into the path of the arms 54 upon the sprocket chain. There is also on the shaft 98 an inwardly extending arm 105, secured rigidly to said shaft and projecting into the path of an arm or trigger 106 on the end of the elevator base, whereby the movement of the elevator will tend to actuate the shaft 98 and the levers thereon.

In the operation of this device, the elevator will be in lowered position, as shown in the figures. The block of ice will be moved in onto the lower platform of the elevator through a slideway 107. When the block of ice is in position, the motor will be started. This will operate the saws so that when the block of ice is moved it will be brought into contact with the moving saws, these saws being spaced a predetermined distance apart, so that when the block of ice is accurately positioned in the elevator it will be cut on each side thereof, the saws forming inwardly extending grooves or kerfs. The operation of the lever 80 upon the shaft 72 will throw the lever arm 61 so as to move the clutch 59 into mesh with the teeth of the drum 60. This will rotate the said drum in the proper direction to the reel up the cable, thus raising the elevator and the block of ice and bringing it upwardly past the saws.

The operation of the lever 80 will also throw the lever arm 75 outwardly so as to move the clutch 26 into engagement with the pulley 25, thus rotating the elevating mechanism. It is to be understood that the throwing of the two clutches 74 and 59 is simultaneous, so that the mechanism will act to rotate the drum 60 as soon as the clutch 59 is thrown into engagement therewith.

When the elevator has reached the upper limit of its travel past the saws, the finger 82 upon the elevator will come in contact with the arm 81 upon the shaft 72, thus rotating the shaft to throw the levers 75 and 61 so as to cut off the power from the elevating mechanism and allow the elevator to drop back. The clutch 74 will be moved positively out of engagement with the pulley 25, but the movement of the rod 66 will only tend to release its hold upon the arm 61 of the clutch 59. The tension upon the spring 65 is so regulated that it will not throw the lever 61 until the tension upon the drum 60 is released.

When the elevator has reached the upper end of its movement, the arm 90 upon the frame of the channel iron will contact with the lower arm of the lever 87, throwing it up so as to move the upper arm downwardly, releasing the belt-shifting bar 83. The spring 86 will then act to throw the arm to the right from the position shown in Fig. 5, thus moving the belt 31 on to the fixed pulley 29 and reversing the direction of movement of the shaft 34 in an obvious manner.

The tripping of the lever 87 to release the belt-shifting mechanism, whereby the direction of rotation of the shaft 34 is reversed, will take place immediately as the elevator reaches the upward end of its travel. The clutch 59 will be still in engagement with the drum 60, and the operation will then be to unreel the cable, allowing the elevator and the saw thereon to drop by their own weight. The strain of the weight upon the cable will be sufficient to maintain the clutch 59 in engagement with the drum, although the force of the spring 65 will tend to throw it out of engagement. This tension will be maintained until the elevator again rests upon the bottom of the supporting framework. As soon as this occurs, the strain of this weight upon the drum 60 will be relieved, and the force of the spring 65 will be sufficient to immediately shift the lever 61 so as to throw the clutch 59 into engagement with the hub of the sprocket wheel 58. When the elevator has reached the lower end of its travel and the spring 65 has thrown the clutch 59 into engagement with the sprocket wheel 58, the continued operation of the device will then act to operate the sprocket chain 57 and the shaft 55 upon which the sprocket wheel 49 is mounted. This will therefore operate the sprocket chain and the arms 54 thereon. One of these arms 53 will be in the position shown in Fig. 2, and will immediately engage the rear end of the block of ice, and force it forwardly against the saws 14, which will be so positioned as to cut kerfs longitudinally of the block of ice, in such manner as to make it possible to break the ice at the desired point. The chain will travel to bring the arm 53 into the position of the arm 54 in Fig. 2. This will force the block of ice out of the frame of the machine, and the arm 53 will contact with the lever 104, moving it rearwardly, and by means of the connection with chain 101 will rotate the shaft 98, and through the chain 96 and the levers 95 and 91 will shift the belt-shifting mechanism so as to throw the belt on to the loose pulley and allow the lever arm 89 to engage within the notch in the base of the bar 83, and hold the belt in neutral position upon the loose pulley, thus stopping the operation of the mechanism. It is to be noted that the movement of the arm 104 by either of the arms 53 or 54, as just noted, will throw this lever arm in such position that it can not be again engaged by the succeeding arm. The lever arm 104 is, however, thrown back into the path of the chain by means of the finger 105 upon the shaft 98 when the elevator is again raised. The trigger 106 will engage said finger when it is raised upwardly, and thus throw the shaft 98 and the intermediate connections to move the arm 104 back into the position shown in Fig. 4. The action of the spring 100 is to prevent breaking of the chain 101 by a too violent jerk, such as might occur in the operation of the device.

When the series of operations thus described has been completed, another block of ice may be shoved in on to the platform of the elevator and the lever arm 80 may be used to rotate the shaft 72, and start over again the same series of operations to hoist the block of ice and score it vertically, to again drop the elevator and start the mechanism to move the ice longitudinally of the frame and score it by means of the saws 14, and deliver it from the machine properly scored.

In the operation of the device, the slipping of the block of ice on the frame as the saws are operating thereon, tends to bend the blades of the saws, and may break them. To overcome this tendency to break the saws, I may mount the saw blades as shown in Fig. 9, fixing the blade upon a hub 107′, keyed slidably to the shaft upon which it is mounted and held resiliently in position thereon by means of springs 108 and 109 on opposite sides of said hub, said springs bearing at their outer ends against clamping nuts or washers 110 and 111 respectively, said nuts being secured to the shaft by radial pins, 112.

Figure 6:
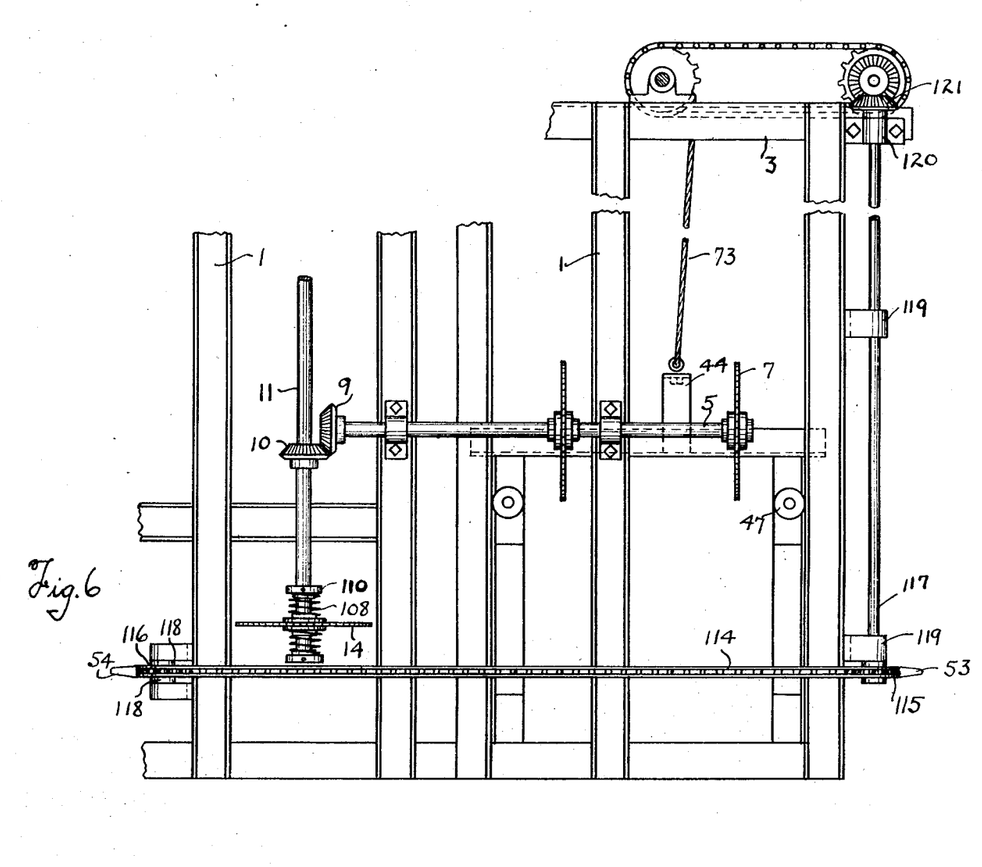
Fig. 6 is a broken side elevation of a slightly different embodiment of the delivering apparatus.
Figure 7:
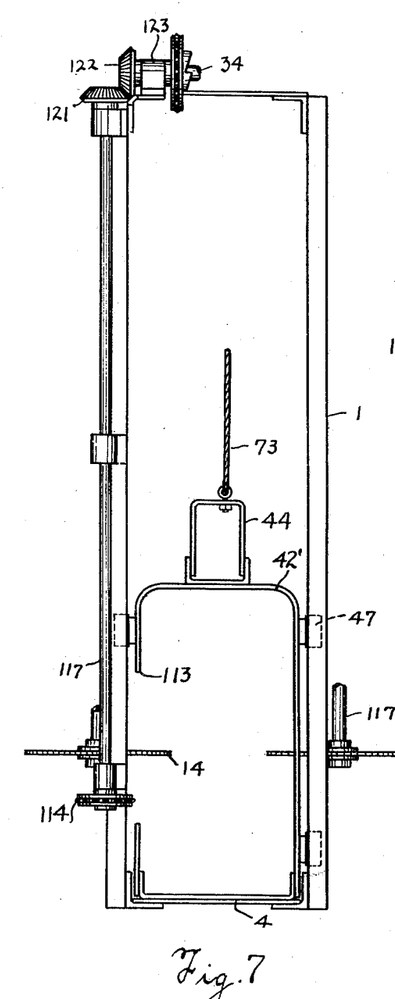
Fig. 7 is a broken end view thereof.
Figure 8:
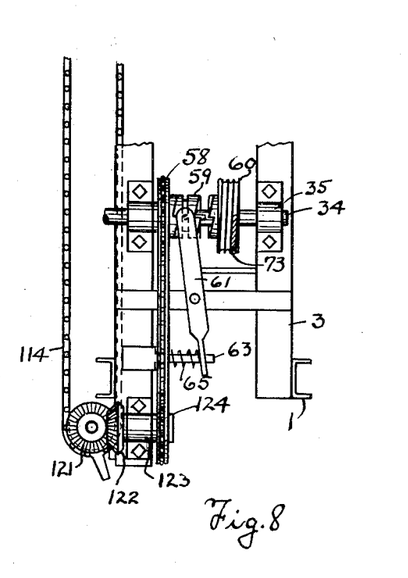
Fig. 8 is a broken top plan view of the device shown in Fig. 6.

In the operation of the machine as previously described, the chain 57, which operates the ice moving-mechanism, is allowed to become slack as the elevator and its frame are moved upwardly. As the chain 57 is not operated at that time, the slack of the chain is not an objection and as the pulleys operating the chain are spaced a material distance apart even when the elevator is raised, there is no tendency of the chain to tangle. The use of this operating mechanism may be altered, however, and in Figs. 6, 7 and 8, a means by which the chain may be operated is disclosed. The frame with the elevator saws thereon is contemplated as being identical in this case to the construction previously described. The elevator frame 42′ is, however, cut away on one side, as shown at 113, for a space sufficient to allow the chain shown at 114 to operate without engaging the frame, by means of the fingers 53 and 54 thereon, the chain being out of the track of the elevator except for these fingers, and it will be noted that they will be in a position at each end of the frame while the elevator is operated.

The chain 114 will be mounted operatively upon sprocket wheels 115 and 116 mounted on a vertical shaft 117 at one end, and a stub shaft 118 at the other end. The shaft 117 extends upwardly the full length of the frame, and is journaled in bearings 119 fixed to the uprights of the framework. At the upper end the shaft is journaled at 120 in the frame work at 3, and has a beveled gear 121 thereon, adapted to mesh with a similar gear 122, mounted upon a short shaft, journaled in the bearing 123 on the frame and having a sprocket wheel 124 on its opposite end. This sprocket wheel is operatively engaged with the sprocket wheel 58, as previously described. It will be noted that the chain will be actuated to move the block of ice longitudinally of the frame in the same manner as was described relative to the previous embodiment, and it is contemplated that similar controlling mechanism will be employed in controlling the operation of the chain.

The advantages of this construction will be readily recognized by those skilled in the art. It will be possible to move a block of ice in on to the elevator and to throw the lever 80 whereby the mechanism of the machine will be started, and the operations thereafter will be entirely automatic, without further thought on the part of the operator. The block of ice will be elevated and scored vertically and dropped and moved longitudinally to score the block horizontally and to throw it from the machine so that a new block may be inserted. When the block has been entirely scored in this way, the mechanism will automatically stop until a new block of ice is in position, after which the throwing of the operating lever 80 will again start it going on the new block. The action will be repeated and the block of ice coming from the machine will be capable of being broken up into pieces of the desired size, with accuracy and with no waste of material.

Having thus described my invention, what I claim as new and desire to protect by Letters Patent is:

1. In an ice scoring machine, an upright frame, an ice elevator adjacent one end thereof, means comprising a rotatable drum and cable thereon to raise said elevator and ice in the path of a plurality of scoring saws, means actuated by the movement of the elevator to reverse said raising means and permitting movement of said elevator downward, means to move said ice longitudinally from said elevator against horizontal scoring saws, and means to stop the operation of said last named means when said ice is past said saws.

2. In an ice scoring machine, an upright frame, an ice elevator adjacent one end thereof, rotatable means to raise said elevator and ice in the path of a plurality of opposite scoring saws, means actuated by the movement of the elevator to reverse the direction of rotation of said raising means and permitting movement of said elevator downward, means operable only when said elevator is lowered to move said ice longitudinally from said elevator against horizontal scoring saws, and automatically operated means to stop the operation of said last named means when said ice is past said saws.

3. In an ice scoring machine, a supporting frame, an ice block elevator therein, a plurality of saws on each side of said frame above said elevator, means to raise said elevator to bring said ice in the path of said saws, means to automatically reverse the movement of said elevator, means automatically started by the movement of said elevator into lowered position to move said ice longitudinally, horizontal scoring saws in the path of said block and means operative when said ice is removed to stop said ice-moving means.

4. In an ice scoring machine, a supporting frame, an ice elevator therein, means to raise said elevator, means to vertically score said ice, separate means to automatically reverse said raising means and lower said elevator, means automatically put in motion by said elevator when said elevator has been lowered to then move said ice horizontally and means to score said ice horizontally as it is thus moved.

5. In an ice scoring machine, a supporting frame, an ice elevator therein, means to raise and lower said elevator, saws adapted to score said ice vertically as said elevator is operated, a chain on said frame having ice engaging arms thereon, means at the upper side of said elevator to operate said chain started only when said elevator is in lowered position, horizontal saws in the track of said ice and a lever operative by the contact with one of said arms to stop said chain when said ice is discharged by said chain.

6. In an ice scoring machine, a supporting frame, an ice elevator therein, a cable on said elevator, a cable drum to which said cable is attached, vertically arranged saws in said frame above said elevator, means to rotate said drum and raise said elevator, automatic means to reverse the direction of rotation of said drum and lower said elevator, an ice-engaging chain automatically started when said ice is lowered to release the load on said cable whereby said ice is moved longitudinally, saws in said frame adapted to score said ice horizontally and means on said chain to stop said chain after it has discharged said ice.

7. In an ice scoring machine, a supporting frame, an ice elevator therein, a cable secured to said elevator, means to reel up said cable and raise said elevator, ice scoring saws in the path of said elevator, means to reverse the reeling means and to allow lowering said elevator, and means automatically started, to then move said ice horizontally and discharge it from said frame and means acting to stop said machine when said ice is discharged.

8. In an ice scoring machine, a supporting frame, an ice elevator, ice scoring saws in the path of said elevator, means to raise said elevator, means to reverse said raising means and lower said elevator, means carried by said elevator to move said ice longitudinally, said means being set in motion when the weight of said elevator and ice is released from said raising means, and means to score said ice horizontally.

9. In an ice scoring machine having a frame, and an elevator at one end thereof, the combination of a reel and cable to raise said elevator, an operated gear wheel on the shaft of said reel, a clutch to engage said wheel operatively with said reel to rotate the same and raise said elevator and retain it in engagement while the weight of said elevator is sustained by said cable means to reverse the gear, and automatically operated means to release said clutch when said elevator is in lowered position.

10. In an ice-scoring machine having a frame, and an elevator at one end thereof, the combination of hoisting means for said elevator comprising a reel, means to rotate said reel to raise said elevator, automatic means to reverse said reel and permit lowering of said elevator, a normally stationary longitudinal carrier, means to operate said carrier actuated only when said elevator has been lowered, and automatic means to stop said carrier in the manner described.

In testimony whereof, I hereunto affix my signature this the 9th day of August, A. D. 1923.

CHARLES R. MILLER.